March 18, 1958 C. A. REHBEIN 2,827,422
CATALYTIC CRACKING
Filed Aug. 10, 1953
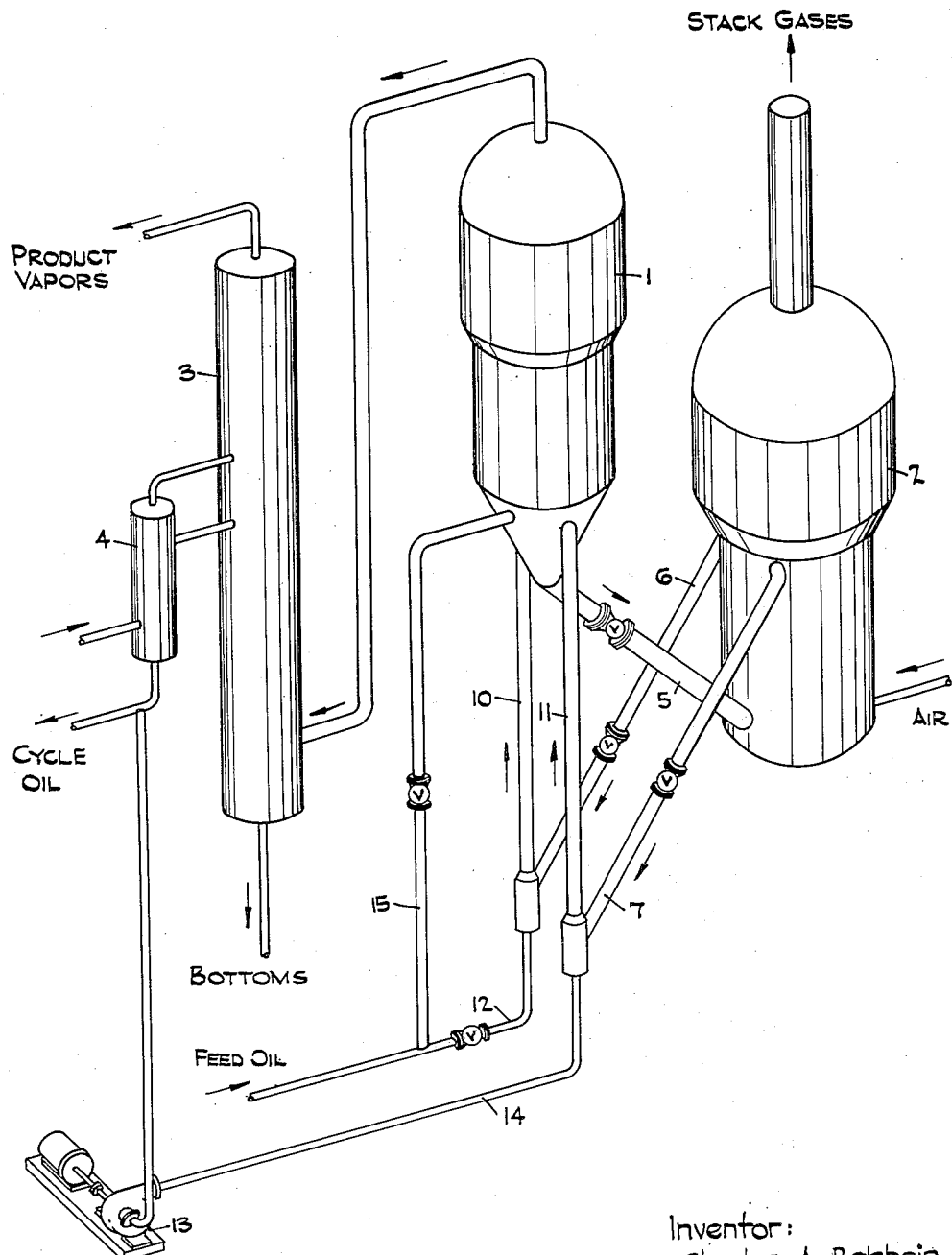
Inventor:
Charles A. Rehbein
By James Todorovic
His Attorney

United States Patent Office 2,827,422
Patented Mar. 18, 1958

2,827,422

CATALYTIC CRACKING

Charles A. Rehbein, New York, N. Y., assignor to Shell Development Company, New York, N. Y., a corporation of Delaware Application August 19, 1953, Serial No. 373,164

2 Claims. (Cl. 196—52)

This invention relates to the catalytic cracking of hydrocarbon oils using the fluidized catalyst technique. It relates more particularly to the catalytic cracking of hydrocarbon oils to produce gasoline in what is known in the art as a heat balanced fluidized catalyst catalytic cracking unit.

The use of finely divided solid catalysts in a pseudo liquid state is known and widely used in the catalytic cracking of hydrocarbon oils. The technique of using such catalysts in such form is referred to as the fluidized catalyst technique. In the catalytic cracking of hydrocarbon oils using the fluidized catalyst technique, a catalyst in a finely divided state is contacted under suitable cracking conditions with vapors of the hydrocarbon oils to be cracked during which operation non-volatile carbonaceous material referred to as coke is deposited on the cracking catalyst thereby rendering it inactive. In order to allow continuous operation a stream of the catalyst is continuously withdrawn from the cracking zone, regenerated by burning off the carbonaceous deposits in a separate zone called the regeneration zone, and returned to the reaction zone. The amount of carbonaceous deposits thus burned in the regeneration zone may range anywhere from about 1% up to about 15% by weight of the feed oil, depending upon the character of the feed oil, the process conditions, and the character of the particular cracking catalyst used. In a commercial unit of even small capacity, the amount of coke thus burned is large. For instance, in a catalytic cracking unit having a capacity of 24,000 bbl./day, a 2% coke yield (which is very low) requires the burning of about 6200 pounds of coke per hour. The burning of a pound of coke yields approximately 14,000 B. t. u. Some special cracking catalysts may be able to withstand a temperature as high as about 1300° F. or even 1400° F., for short periods without excessive deactivation. However, the catalysts used in commercial practice begin to sinter and lose activity if subjected to temperatures much in excess of 1100° F. and, consequently, it is the general practice to operate the process so that the catalyst is not subjected to temperatures above 1100° F., or possibly 1200° F. in extreme cases.

The heat generated in the regeneration zone, even at very low coke makes, would quickly raise the temperature level much above the allowable limit if it were not withdrawn. Some of the heat is removed from the regeneration zone with the hot flue gases and some is removed by radiation and other minor losses. There still remains a very substantial amount of heat that must be removed in order to retain the regeneration temperature at a safe level. In the past this heat has been removed by cooling the regeneration zone. Various other means of doing this have been suggested but in commercial practice it has been done by recycling part of the hot catalyst through a cooler and back to the regeneration zone. Steam is generated in the cooler. This means for removing the heat has several disadvantages. The coolers required for this service are very large and costly structures. For practical reasons, it is necessary to place these coolers below the regenerator and, consequently, the very large and heavy regeneration vessel has to be supported at a relatively high elevation; this requires a costly structure. The coolers are also subject to severe erosion by the abrasive catalyst particles and their maintenance is costly. Also the utilization of the heat to form steam, and subsequent utilization of the steam is not a thermally efficient operation.

It is now known that in cases where the coke production is less than about 6.5% by weight of the feed oil, these disadvantages may be avoided by what is known in the art as a heat balanced unit. In a heat balanced unit, the total excess heat generated in the regeneration side of the unit is utilized in the reaction side of the unit and all cooling of the regeneration zone is dispensed with.

While a heat balanced catalytic cracking unit may look like any conventional catalytic cracking unit which is not heat balanced, except for the absence of any cooling on the regeneration side, the operation of a heat balanced unit is quite distinct from the operation in a non-heat balanced unit mainly because of the lack of flexibility and the different methods of control required in the former. In order to understand the present invention it is, therefore, essential that certain fundamental characteristics of a heat balanced catalytic cracking operation be clearly understood. These fundamentals may perhaps be best explained by describing briefly how such a heat balanced unit is designed.

For any given feed stock the so-called coke make increases with the extent of cracking, i. e., the percent conversion. Also, for any given feed stock there is a conversion which gives maximum gasoline yields. Also, there is an optimum cracking temperature. For most feed stocks the optimum conversion is around 55%, and the optimum temperature is between about 875° F. and 950° F. In the design of a heat balanced fluidized catalyst catalytic cracking unit, a given feed rate of a given feed stock is considered as a basis and the coke make under the optimum cracking conditions is determined. The first prerequisite of a heat balanced operation is that this coke make be not more than about 6.5% by weight of the feed. If the coke make is in the proper range, the given feed rate times the percent conversion to coke gives the amount of coke to be burned in the regeneration zone. Very briefly stated, the regeneration vessel is designed to burn this amount of coke and provision is made for supplying the required amount of air. The amount of heat removed by the combustion gases, radiation, etc., is then determined for the chosen regeneration temperature. Thus, the coke make and heat release are fixed and the remaining heat that must be removed in order to retain the desired regeneration temperature is also fixed. This heat is removed by the introduction of relatively cool partially spent catalyst from the reactor and withdrawal of relatively hot freshly regenerated catalyst. Thus, the catalyst circulation rate is fixed. Since the amount of feed is set beforehand, the catalyst to oil ratio is also fixed. The temperature of the feed oil is then adjusted to give the mentioned optimum reaction temperature when mixed with this fixed amount of hot catalyst at the said regeneration temperature level.

While the above method leads to a perfectly heat balanced operation, there are certain practical factors which render such a simple calculable system undesirable. The first of these is that in the usual case it is profitable and desirable to recycle at least a part of the gas oil recovered from the catalytic cracking operation. It has been shown that in this case, it is more desirable to transfer the hot freshly regenerated catalyst to the reaction zone with the more refractory cycle stock rather than the virgin feed oil. This not only avoids an appreciable amount of overcracking of the less refractory virgin feed oil but also results in gasoline of superior quality from the cracking of the cycle oil. However, if it is attempted to transfer the required amount of regenerated catalyst to the reactor with the cycle oil in such a heat balanced operation, this cycle oil is cracked at excessive temperatures which lead to overcracking, the production of excessive amounts of gas, loss in gasoline yield, and production of more coke. This increased amount of coke, even if small, creates more heat which requires a greater catalyst recycle rate and this, in turn, further aggravates the situation. Due to the relative inflexibility of heat balanced units, this condition can only be overcome by lowering the conversion through increasing the space velocity (by decreasing the amount of catalyst in the reactor) until the coke make equals the calculated value for which the unit was designed. This results in a lowered gasoline yield.

I have found that these difficulties may be avoided while still maintaining heat balanced operation by providing and properly utilizing two catalyst riser lines. Thus, I provide two riser lines which feed the fixed regenerated catalyst to the reactor. I supply the major amount of the total required regenerated catalyst to the reaction zone through one riser with vapors of the cycle oil, thereby to avoid overcracking of the virgin feed and, at the same time, producing gasoline of superior quality from the cycled stock, and I supply the remaining minor amount of the total required hot freshly regenerated catalyst to the reaction zone with the virgin feed at a temperature below the chosen reactor temperature. Thus, I employ two riser lines, one of which is operated at a temperature which is above the temperature in the fluidized bed in the reactor and the other of which is below the temperature in the reactor, and the mixture of these two streams in the reaction zone create the desired optimum cracking temperature therein.

The temperature in the fluidized catalyst bed in the reaction zone is normally about 900° F. but may vary from this by approximately 50° F. depending upon the particular feed stock for which the unit is designed. The regeneration temperature is normally about 1100° F. but may vary from this by approximately 100° F. The temperature of the mixture of hot regenerated catalyst and cycle oil transferred by the high temperature riser is preferably about 1000° F. but may vary from this by approximately 25° F. The temperature in the low temperature riser is below the reaction temperature but sufficiently high to insure complete vaporization of the oil therein. This temperature will generally be between about 800° F. and about 875° F., but may be somewhat higher or lower in certain cases.

The invention which I have described in more general terms above will now be described in more detail with respect to a specific example. In this description, reference will be had to the heat balanced fluidized catalyst catalytic cracking unit specifically designed and arranged to allow application of the principles of my invention and illustrated semidiagrammatically in the accompanying drawing.

The specific example chosen for the purpose of illustrating the invention deals with the catalytic cracking of a typical catalytic cracking feed stock, namely a distillate gas oil fraction obtained by flash distillating a topped crude petroleum. The optimum gasoline yield is obtained from this feed stock when cracking it to a conversion of about 55% at a tempuerature of about 900° F. It is advantageous to recycle at least part of the gas oil separated from the product. The optimum recycle rate is about one-half that the virgin feed oil. The total amount of fresh feed stock in the particular case is 48,000 barrels per day, and the cycle oil rate is, therefore, about 24,000 barrels per day, making a combined feed rate of about 72,000 barrels per day. The catalytic cracking unit is designed for a coke make of 3.5% by weight based on the total feed. The amount of coke to be burned is, therefore, about 32,675 lbs./hr. The reaction temperature is set at the optimum value of 900° F. and the regeneration temperature is set at the safe limit of 1100° F. The required catalyst circulation rate is therefore about 111,800 lbs./minute.

Referring to the drawing, it will be seen that the unit comprises a fluidized catalyst reactor 1, a fluidized catalyst regenerator 2, a product fractionator 3 with gas oil sidestripper 4. A single reactor standpipe 5 is arranged to pass partially spent and stripped catalyst from the reactor by gravity flow to the regenerator. The regenerator is provided with two inclined standpipes 6 and 7 containing control valves 8 and 9 and these standpipes communicate with two vertical reactor riser lines 10 and 11 which discharge into the bottom of the reactor. In operation the reaction and regeneration vessels 1 and 2 are filled approximately one-half with fluidized (pseudo liquid) beds of the catalyst which beds constitute the cracking and regeneration zones, respectively. The fresh feed oil to be cracked is introduced by line 12. Catalytically cracked gas oil (cycle oil) is recycled from the sidestripper 4 by pump 13 and line 14. The flow of the catalyst is as follows: from the pseudo liquid bed in the generator down through the standpipes 6 and 7, up through the risers 10 and 11 into the bottom of the pseudo liquid bed of catalyst in the reactor, and then down through the reactor standpipe 5 back to the pseudo liquid bed in the regenerator.

As pointed out above, the catalyst recycle rate in this particular case is about 111,800 pounds per minute. Of this amount 32% or 36,200 pounds per minute are withdrawn by standpipe 6 and the remaining 68% or 57,600 pounds per minute are withdrawn from the regeneration vessel by standpipe 7. The fresh feed oil, e. g., straight run gas oil, introduced by line 12 is injected into the bottom of standpipe 12 wherein it mixes with and is vaporized by the hot regenerated catalyst from standpipe 6 and the mixture passes up through the riser 10 to the fluidized catalyst bed in the reactor. As previously stated, the temperature in the reaction zone is maintained at 900° F. The amount of oil introduced through riser 10 is such that when mixed with the catalyst from standpipe 6 the temperature of the mixture is below the above reaction temperature. It is important, however, that the ratio of oil to catalyst be such that the oil is completely vaporized by the hot catalyst. In such cases where the amount of oil would be in excess of the amount vaporizable by the given stream of catalyst a portion of the fresh feed oil is by-passed and fed directly by line 15 into the fluidized bed in the reactor.

As stated, 68% of the recycled catalyst is withdrawn from the regenerator by standpipe 7 and transferred to the reactor by line 11. This catalyst is transported to the bed of catalyst in the reaction zone via riser 11 with the catalytically cracked cycle oil introduced by pump 13 and line 14. The temperature of the mixture in line 11 is above the chosen reaction temperature and in the particular case in question is 1000° F. Thus, the amount of catalyst which has to be recycled is split into two portions and transferred to the reaction zone in two separate streams having different temperatures one of which is below the reaction temperature and the other of which is above the reaction temperature and the amounts of the two streams are such that the desired temperature in the fluid catalyst bed in the reaction zone is obtained upon mixing them.

It will be understood that the process described may be applied for the catalytic cracking of various hydrocarbon oils such as reduced crudes, gas oils and the like and that any of the conventional finely-divided cracking catalysts such as for instance synthetic silica-alumina cracking catalyst, silica-magnesia cracking catalyst, activated clay cracking catalyst, and the like may be used. Also, details of the operation which are not relevant to the invention such as, for instance, means for stripping the partially spent catalyst, means for aeration of the standpipes, means for supplying fresh catalyst for replacement, and the like, although not illustrated or discussed, are not excluded.

It is claimed:

1. In the catalytic cracking of a hydrocarbon oil in a fluidized catalyst catalytic cracking operation wherein a finely divided catalyst is circulated at a rate fixed to maintain the reaction zone and regeneration zone in heat balance at temperatures of approximately 900° F. and 1100° F., respectively, the combination of process steps comprising, maintaining a bed of fluidized finely divided cracking catalyst at the said reaction temperature by continuous introduction into the same of two separate streams of oil vapors carrying hot freshly regenerated catalyst in suspension, one of said streams consisting of vapors of catalytically cracked cycle oil from the process and a major part of the recycled catalyst and being at a temperature above said reaction temperature, and the other of said streams comprising vapors of fresh feed oil to be cracked and the remaining minor part of the recycled catalyst and being at a temperature below said reaction temperature.

2. In the catalytic cracking of a hydrocarbon oil in a fluidized catalyst catalytic cracking operation wherein the catalyst is continuously regenerated by burning carbonaceous deposits from it in a regeneration zone and the temperature in said regeneration zone is maintained at about 1100° F. solely by circulation of catalyst through said regeneration zone and through a separate reaction zone, the improved method for transporting the required amount of hot catalyst from the regeneration zone to the reaction zone which comprises suspending a major amount of the required catalyst in vapors of catalytically cracked cycle oil from the process and passing the mixture into a fluidized bed of catalyst in the reaction zone, the amounts of said catalyst and said cycle oil being such that the temperature during said transport is about 1000° F., suspending the remaining minor amount of the required catalyst in vapors of fresh feed oil to be cracked and passing the mixture into the same said bed of catalyst in the reaction zone, the amounts of said catalyst and fresh oil being such that the temperature during said transport is below the temperature in said bed in said reaction zone, and the amounts of the two streams thus transported being adjusted such that the said bed of catalyst in the reaction zone is maintained at about 900° F. by the heats supplied in the two streams.

References Cited in the file of this patent

UNITED STATES PATENTS

| | | |
|---|---|---|
| 2,377,613 | Conn | June 5, 1945 |
| 2,416,608 | Brackenbury | Feb. 25, 1947 |
| 2,432,277 | Brackenbury | Dec. 9, 1947 |
| 2,438,728 | Tyson | Mar. 30, 1948 |
| 2,460,404 | Ward | Feb. 1, 1949 |
| 2,558,194 | Orescon | June 26, 1951 |
| 2,710,279 | Siecke | June 7, 1955 |